J. TRENT,
Assignor to THE MANHATTAN BURNER CO.
Lantern.
No. 9,191. Reissued May 4, 1880.
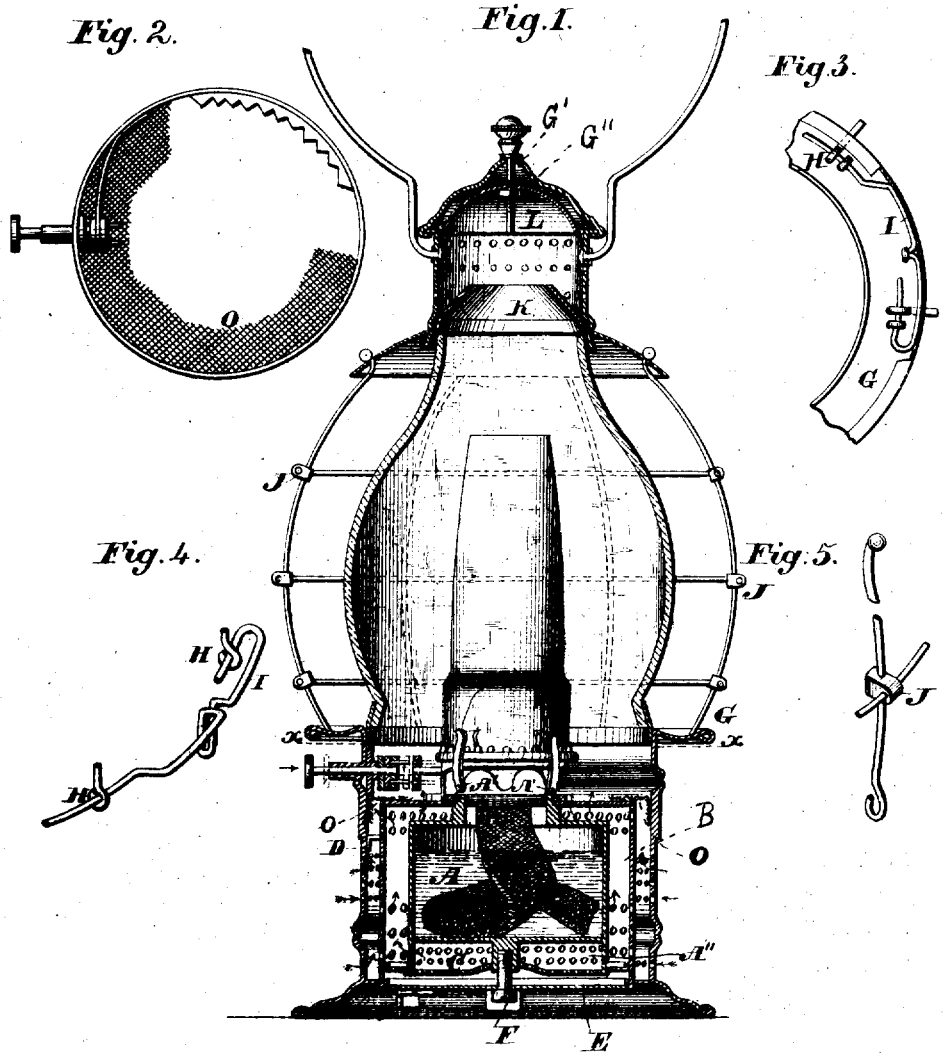
*Attest:*
Jas E. Hutchinson.
Alex. Scott
*Inventor:*
Joseph Trent.
By G Staehpole
Atty.

UNITED STATES PATENT OFFICE.

JOSEPH TRENT, OF NEW YORK, N. Y., ASSIGNOR TO THE MANHATTAN BURNER COMPANY, OF SAME PLACE.

LANTERN.

SPECIFICATION forming part of Reissued Letters Patent No. 9,191, dated May 4, 1880.

Original No. 216,541, dated June 17, 1879. Application for reissue filed September 13, 1879.

*To all whom it may concern:*

Be it known that I, JOSEPH TRENT, of New York city, in the county and State of New York, have invented certain new and useful Improvements in Lanterns, which improvements are fully set forth in the following specification and accompanying drawings, in which—

Figure 1 is a vertical central section of my improved lantern. Fig. 2 is a cross-section on line *x x* of Fig. 1. Fig. 3 is a detached portion of the rim and basket, showing the bolt locking the basket to the rim. Fig. 4 is a detached view of the bolt and a portion of the basket. Fig. 5 is a detached portion of the basket, showing its construction.

The object of my invention is to produce a lantern that shall be strong and substantial, and that may be used for signaling in all kinds of weather, and which cannot be extinguished by any of the various motions to which signal-lanterns are subjected, while it is so constructed that a much larger flame is produced, and that with the common heavy-grade oil. All other signal-lanterns use a special signal-oil manufactured for the purpose.

My invention consists in surrounding the oil-fount with an inside perforated jacket, an outside perforated casing, an annular perforated flange depending from the bottom of the fount, a perforated inner bottom, and an outside supplementary bottom, all of which are so constructed and held together that they may be readily detached for the purpose of cleaning or repairs. A space is left between its edge and the outside casing, so that the heated air may pass it and discharge through the perforations in the outer casing above the dome.

The wires that form the basket that surrounds the glass are held together at their junctions by means of double rectangular eyes, through which they pass, making it very strong and substantial. The basket is held to the rim by means of eyes turned on the lower ends of the vertical wires of the basket, and they pass through holes in the rim of the casing, and a bolt so bent as to pass through two or more eyes at the same time holds them secure. Said bolt is so bent that each end enters eyes at the same time, so that a very slight sliding motion secures or lets go of the wires.

A is the fount. B is the inner perforated jacket. D is the outside casing; E, the supplementary bottom, which fits into a perforated rim of the jacket B, which depends below the perforated bottom, C. A″ is the perforated annular flange, attached to and depending from the oil-fount A.

The fount A has a neck, which passes through a hole in the top of the jacket B. A thread is cut on the outside of said neck, and a nut, A′, is screwed down against the top of the jacket, holding the fount to the jacket. Shoulders on the neck of the fount hold the top of the fount a distance from the top of the jacket, so as to leave an air-space between them.

The jacket B helps to keep the oil warm, enabling me to use a very heavy grade of oil.

F is a screw which passes through the detachable bottoms E and C and into a lug on the bottom of the fount, holding said bottoms in place.

By taking out the screw F the bottoms may be removed for cleaning, and by removing the nut A′ the fount may be removed for the same purpose or for repairs.

By my construction the air entering through the perforations is deflected by the jacket B and passes part into the space between the casing and the jacket, and thence to the burner, and part up through the gauze diaphragm O, to create a draft in the globe.

The perforated depending flange A″ is especially necessary to break the air and preserve the flame when a quick downward motion is given to the lantern.

K is the conical guard, and L is the adjustably-suspended dome within the perforated top to break the downward current of air when a quick upward motion is given to the lantern. G′ is the screw by which the dome L is suspended. G is the flange, and I is the bolt that holds the basket to the flange. J J are the double rectangular eyes for holding the wires of the basket together at their junctions. H H are the eyes on the lower ends of the wires, through which the bolt I passes to hold them to the rim.

Having thus described my invention, what I claim as new, and desire to secure by Letters Patent, is—

1. An oil-fount for a lantern having the annular perforated flange A″ depending from its bottom, in combination with the perforated detachable bottom C and supplementary bottom E, held in position by the screw F, substantially as and for the purpose set forth.

2. The fount A and bottoms C and E, in combination with the jacket B, and attached thereto by means of the nut A′, screwed on the neck of the fount, substantially as and for the purpose set forth.

3. The combination of the oil-fount A, jacket B, nut A′, outer casing, D, bottoms C and E, and wire-gauze diaphragm O, all constructed substantially as and for the purpose set forth.

JOSEPH TRENT.

Witnesses:

C. P. N. WEATHERBY,

A. HURD.